US012181782B2

(12) United States Patent
Hicks et al.

(10) Patent No.: US 12,181,782 B2
(45) Date of Patent: Dec. 31, 2024

(54) MAGNETIC SMARTPHONE MOUNT FOR SPORTING EQUIPMENT SUCH AS A COMPOUND BOW, TRADITIONAL BOW, RIFLE, OR CROSSBOW

(71) Applicant: Painted Arrow LLC, Clayton, MI (US)

(72) Inventors: Nathaniel Allen Hicks, Clayton, MI (US); Devin Michael Cole, Parma, MI (US)

(73) Assignee: Painted Arrow LLC, Clayton, MI (US)

( * ) Notice: Subject to any disclaimer, the term of this patent is extended or adjusted under 35 U.S.C. 154(b) by 148 days.

(21) Appl. No.: 18/060,151

(22) Filed: Nov. 30, 2022

(65) Prior Publication Data

US 2023/0244129 A1 Aug. 3, 2023

Related U.S. Application Data

(60) Provisional application No. 63/305,906, filed on Feb. 2, 2022.

(51) Int. Cl.
*G03B 17/56* (2021.01)
*F16B 1/00* (2006.01)
*F41B 5/14* (2006.01)

(52) U.S. Cl.
CPC ............ *G03B 17/561* (2013.01); *F16B 1/00* (2013.01); *F41B 5/1492* (2013.01); *F16B 2200/83* (2023.08)

(58) Field of Classification Search
None
See application file for complete search history.

(56) References Cited

U.S. PATENT DOCUMENTS

| 4,890,128 A * | 12/1989 | Kania | G03B 29/00 |
| | | | 396/429 |
| 7,647,922 B2 * | 1/2010 | Holmberg | F41B 5/14 |
| | | | 124/88 |
| 8,328,440 B2 * | 12/2012 | Piltz | G03B 17/00 |
| | | | 396/428 |

(Continued)

OTHER PUBLICATIONS

Smart Phone Bow Mount the Fatso, Midwest Orion, www.midwestorion.com, Oct. 19, 2021, web.archive.org/web/20211019081013/www.midwestorion.com/products/cell-phone-bow-video-camera-mount. (Year: 2021).*

(Continued)

*Primary Examiner* — Rodney E Fuller
(74) *Attorney, Agent, or Firm* — Endurance Law Group PLC; James R. Yee

(57) ABSTRACT

A mounting device to mount a personal device to sporting equipment includes a mounting bracket, a magnetic device, a magnetic plate and a foam dampener. The mounting bracket has a first end portion, a middle portion and a second end portion. The middle portion extends along an axis. The first end portion has a slot. The second end portion includes a personal device mounting portion. The magnetic device is coupled to the personal device mounting portion of the send end portion of the mounting bracket. The magnetic plate is configured to be affixed to the personal device. The foam dampener is affixed to the middle portion of the mounting bracket and configured to be compressed between the mounting bracket and the sporting equipment when mounted thereto.

18 Claims, 8 Drawing Sheets

(56) References Cited

U.S. PATENT DOCUMENTS

| | | | | |
|---|---|---|---|---|
| 8,971,959 B2* | 3/2015 | Hunt | ................... | F16M 13/022 |
| | | | | 455/90.3 |
| 9,671,191 B1* | 6/2017 | Sullivan | ................... | F41G 1/467 |
| 10,408,565 B2* | 9/2019 | Albrecht | ................ | F41C 27/00 |
| 11,098,975 B2* | 8/2021 | Evans | ................... | F41B 5/1492 |
| 2010/0272428 A1* | 10/2010 | Piltz | ...................... | G03B 17/00 |
| | | | | 396/428 |
| 2010/0313462 A1* | 12/2010 | Holmberg | ............... | F41C 27/00 |
| | | | | 42/124 |
| 2012/0073556 A1* | 3/2012 | Knowles | .............. | F41B 5/1484 |
| | | | | 124/88 |
| 2012/0151815 A1* | 6/2012 | Tate | .................... | F16M 13/022 |
| | | | | 211/85.7 |
| 2012/0240444 A1* | 9/2012 | Russell | .................. | F41G 3/165 |
| | | | | 396/419 |
| 2013/0058639 A1* | 3/2013 | Galik | .................... | G03B 29/00 |
| | | | | 396/428 |
| 2013/0111798 A2* | 5/2013 | Russell | .................. | G03B 17/48 |
| | | | | 396/419 |
| 2014/0317987 A1* | 10/2014 | Kuehl | .................. | F16M 11/105 |
| | | | | 42/90 |
| 2017/0261286 A1* | 9/2017 | Galloway | .................. | F41J 5/10 |
| 2019/0178605 A1* | 6/2019 | Evans | ..................... | F41B 5/148 |
| 2022/0082350 A1* | 3/2022 | Padilla | .................. | F41B 5/1461 |
| 2022/0228708 A1* | 7/2022 | Chao | ...................... | F16M 11/40 |
| 2022/0228709 A1* | 7/2022 | Chao | ...................... | F21V 21/096 |
| 2022/0357637 A1* | 11/2022 | Park | ....................... | F16M 11/22 |

OTHER PUBLICATIONS

The Bearded Redenck, Unboxing the Best Phone Bow Mount?, www.youtube.com/watch?v=wcRTHsZe-zE, 2018. (Year: 2018).*

Newbys Outdoors, Magnetic smart phone holder for bows, www.youtube.com/watch?v=HW-9zR-hwQg, 2018. (Year: 2018).*

* cited by examiner

MAGNETIC SMARTPHONE MOUNT FOR SPORTING EQUIPMENT SUCH AS A COMPOUND BOW, TRADITIONAL BOW, RIFLE, OR CROSSBOW

CROSS REFERENCE TO RELATED APPLICATIONS

This application claims priority to U.S. Provisional Patent Application 63/305,906, filed on Feb. 9, 2022, the entire disclosure of which is hereby incorporated by reference and relied upon.

FIELD OF THE INVENTION

The invention relates generally to a mounting device configured to mount a personal device to sporting or hunting equipment, such as a compound bow or a crossbow.

BACKGROUND OF THE INVENTION

In the outdoor industry, as it relates specifically to archery hunting, there is an increasing interest in filming one's hunts. The term that is often used is "self-filming." The problem is, there is a massive barrier to entry that is largely driven by the cost of the required camera gear. Many users have interest in filming their hunts, but do not have the ability to afford much of the gear that is required. Not only is there a massive cost associated, but the actual process is very cumbersome, time consuming, and can take away from the overall experience.

The present invention is aimed at one or more of the problems identified above.

BRIEF SUMMARY OF THE INVENTION

The present invention provides a magnetic mount that allows users to quickly and securely fasten a personal device, such as their smartphone to sporting equipment such as a traditional bow, compound bow, crossbow or firearm for the purpose of filming their hunts.

In one aspect of the present invention, a mounting device to mount a personal device to sporting equipment includes a mounting bracket, a magnetic device, a magnetic plate and a dampener. The mounting bracket has a first end portion, a middle portion and a second end portion. The middle portion has first and second ends and extends between the first and second ends along an axis. The first end portion has a slot and extends from the first end of the middle portion of the mounting bracket in a first direction transverse the axis. The second end portion extends from the second end of the middle portion of the mounting bracket. The second end portion including a personal device mounting portion. The magnetic device is coupled to the personal device mounting portion of the send end portion of the mounting bracket. The magnetic plate is configured to be affixed to the personal device and to be removably coupled to the magnetic device. The dampener affixed to a bottom side of the middle portion of the mounting bracket

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 1:
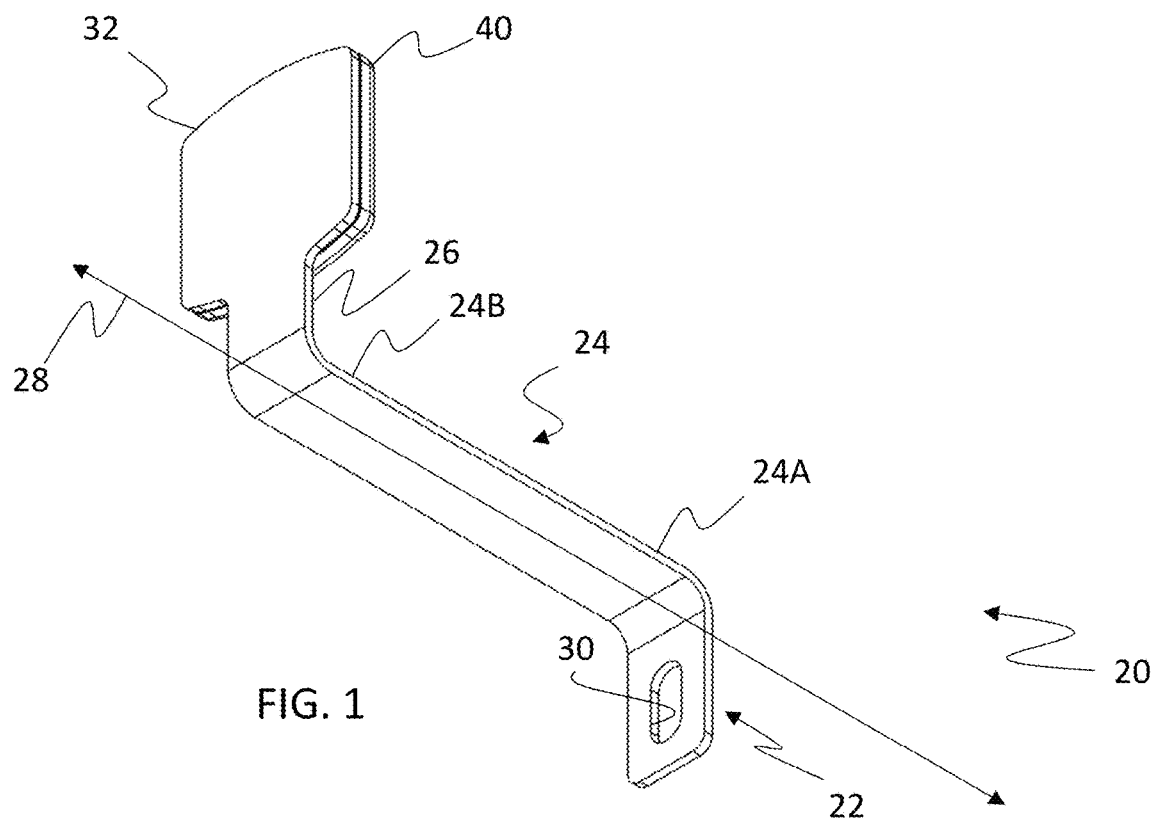
FIG. 1 is a perspective view of a mounting device configured to mount a personal device to sporting equipment, according to a first embodiment of the present invention.
Figure 2:
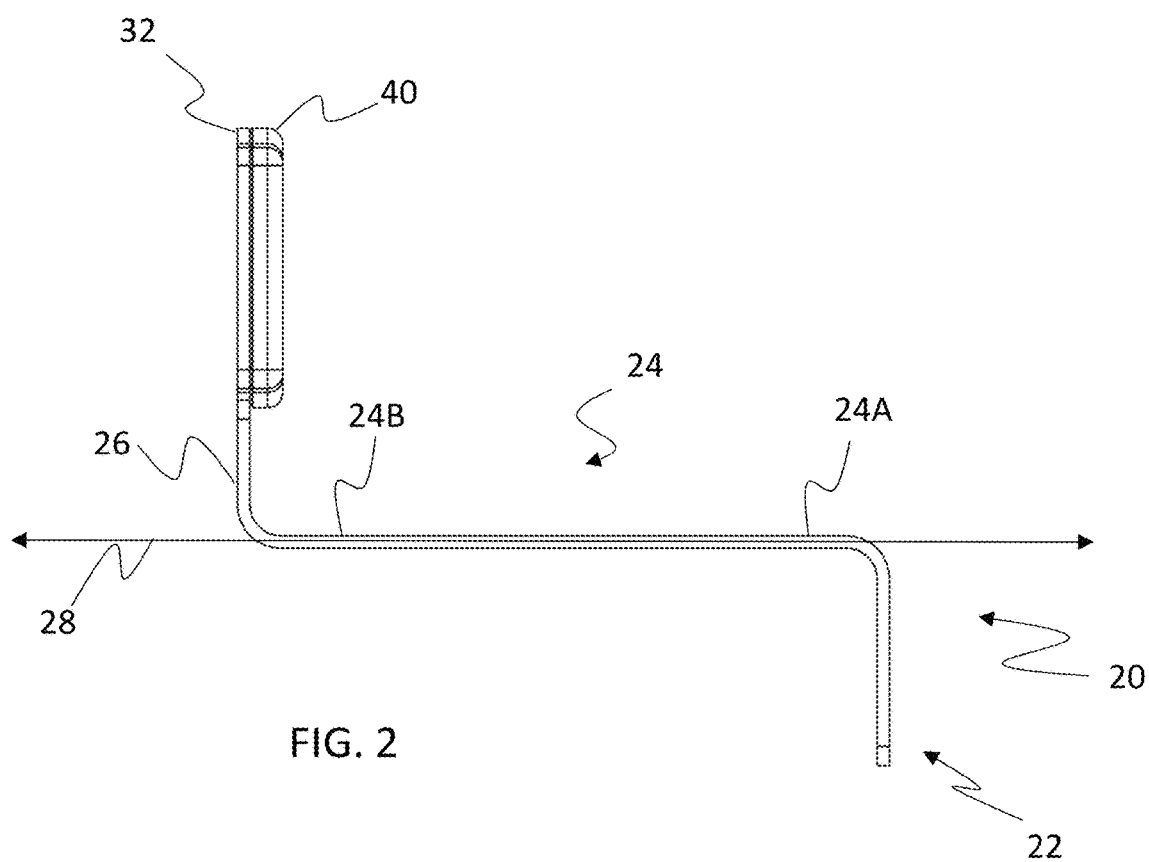
FIG. 2 is a side view of a bracket of the mounting device of FIG. 1.
Figure 3:
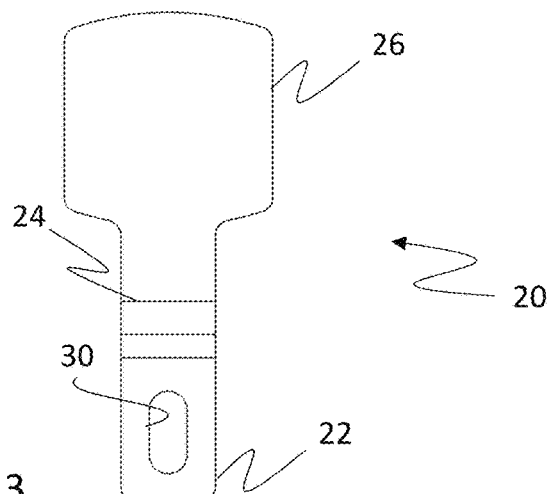
FIG. 3 is a front view of the bracket of FIG. 2.
Figure 4:
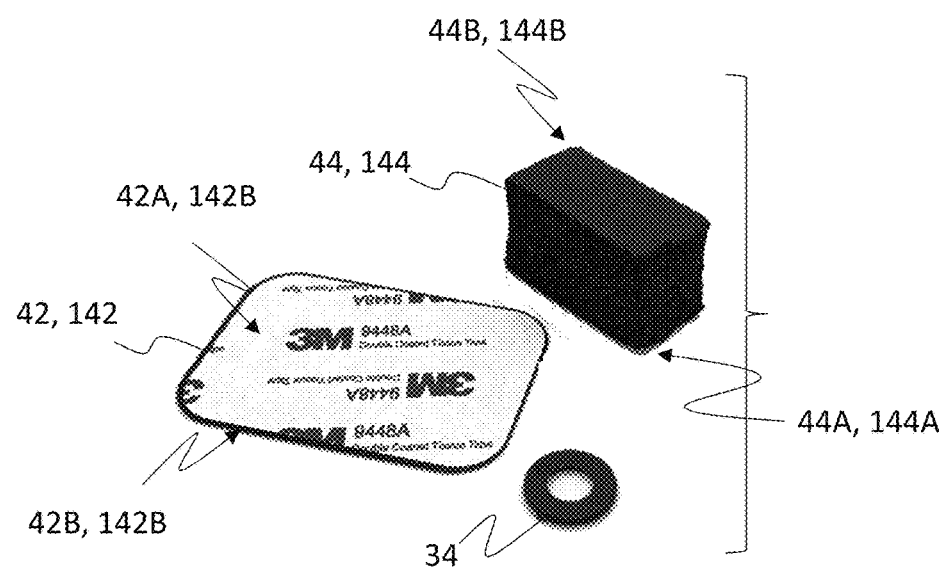
FIG. 4 is an illustration of other components of the mounting device of FIG. 1, including a dampener, a phone plate, and a nylon washer.

Referring to the figures, wherein like numerals indicate like or corresponding parts throughout the several views, a mounting device 10 is configured to mount a personal device 12 (see FIG. 5), such as a smartphone to sporting equipment 14, such as a compound bow 16 (FIGS. 5 and 6), a crossbow 18 (FIGS. 11 and 12), a traditional bow, a firearm or rifle or other piece of sporting equipment. In the illustrated embodiments, the mounting device 10 includes a mounting bracket 20, 120, a magnetic device (including at least one magnet, see below) 40, 140, a magnetic plate 42, 142 and a dampener 44, 144. The dampener 44, 144 is made from a compressible material such as foam to provide dampening between the sporting equipment 14 and the personal device 12 to absorb shock. For instance, when personal device 12 is being used to record video while the sporting equipment 14 is being used, the dampener 44, 144 absorbs shock waves emanating from the sporting equipment 14 to prevent or minimize the shock waves reaching the sporting equipment 14 and adversely affecting the video being recorded.

The mounting bracket 20, 120 includes a first end portion 22, 122 a middle portion 24, 124 and a second end portion 26, 126. The middle portion 24, 124 has first and second ends 24A, 24B, 124A, 124B and extends between the first and second ends 124A, 124B along an axis 28, 128.

The first end portion 22, 122 has a slot 30, 130 and extends from the first end 24A, 124A of the middle portion 24, 124 of the mounting bracket 20, 120 in a first direction transverse the axis 28, 128. The slot 30, 130 may be open or closed (see below). The second end portion 26, 126 extends from the second end 24B, 124B of the middle portion 24, 124 of the mounting bracket 20, 120. The second end portion 26, 126 includes a personal device mounting portion 32, 132.

The magnet device 40, 140 is coupled to the personal mounting portion 32, 132 (see below). The magnetic plate 42, 142 has adhesive on one side and is configured to be affixed to one side of the personal device mounting portion 32, 132. In use, the magnetic plate 42, 142 is composed from, steel, such as 14-gauge 1008 steel, or other suitable material, and is removably coupled to the personal device mounting portion 32 via the magnetic device 40, 140.

With reference to FIGS. 1-6 and 7A-7D, the mounting device 10 is configured to mount a personal device 12 to a compound bow 16. In the illustrated embodiment, the slot 30 is closed. The slot 30 is elongated and is configured to receive a fastener 36 to allow the mounting bracket 20 to be affixed to the sporting equipment 14. The slot 30 being elongated allows a position of the mounting bracket 20 to be adjusted relative to the sporting equipment 14.

Figure 5:
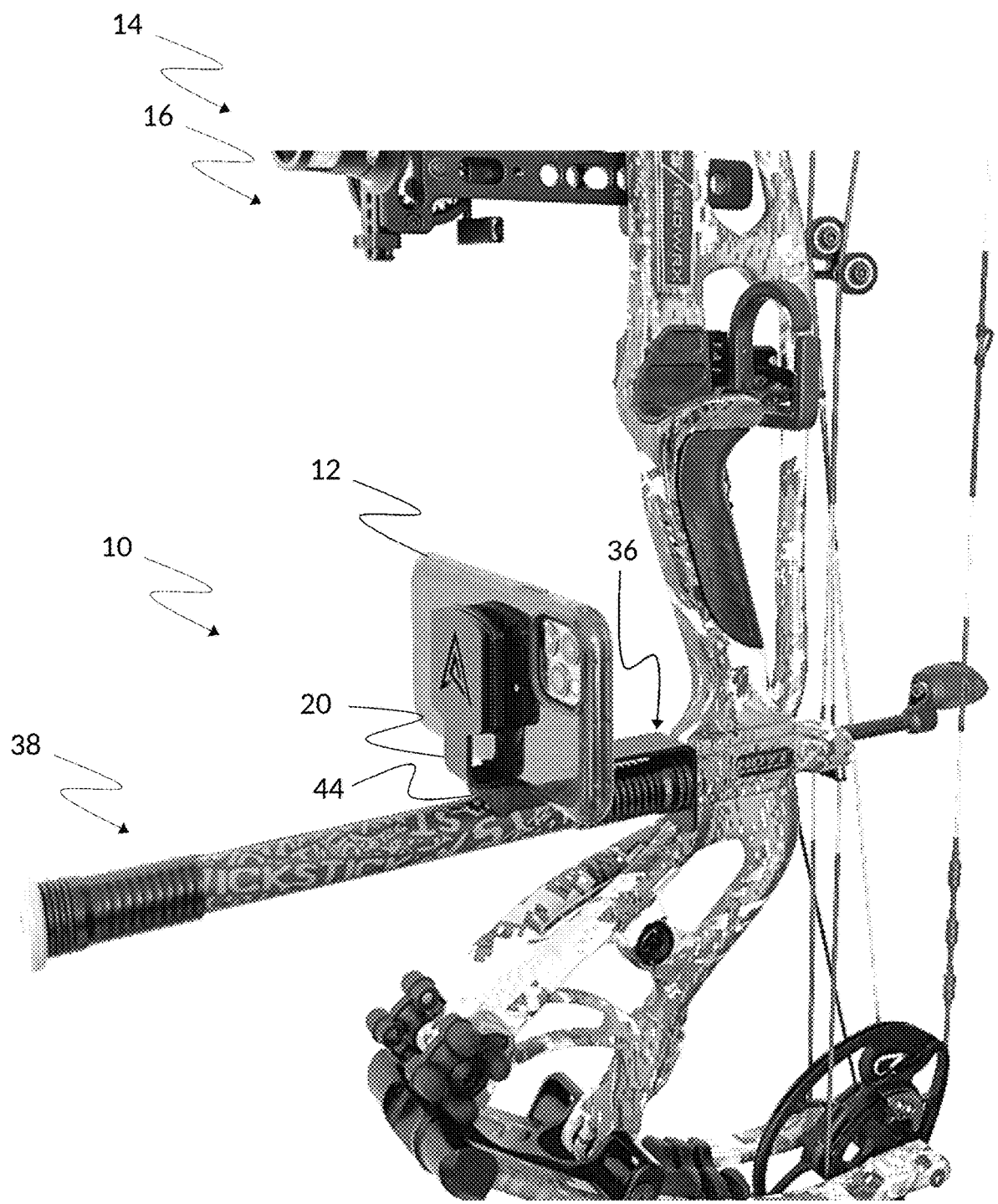
FIG. 5 is a perspective view of the mounting device and a smartphone installed on a compound bow.
Figure 6:
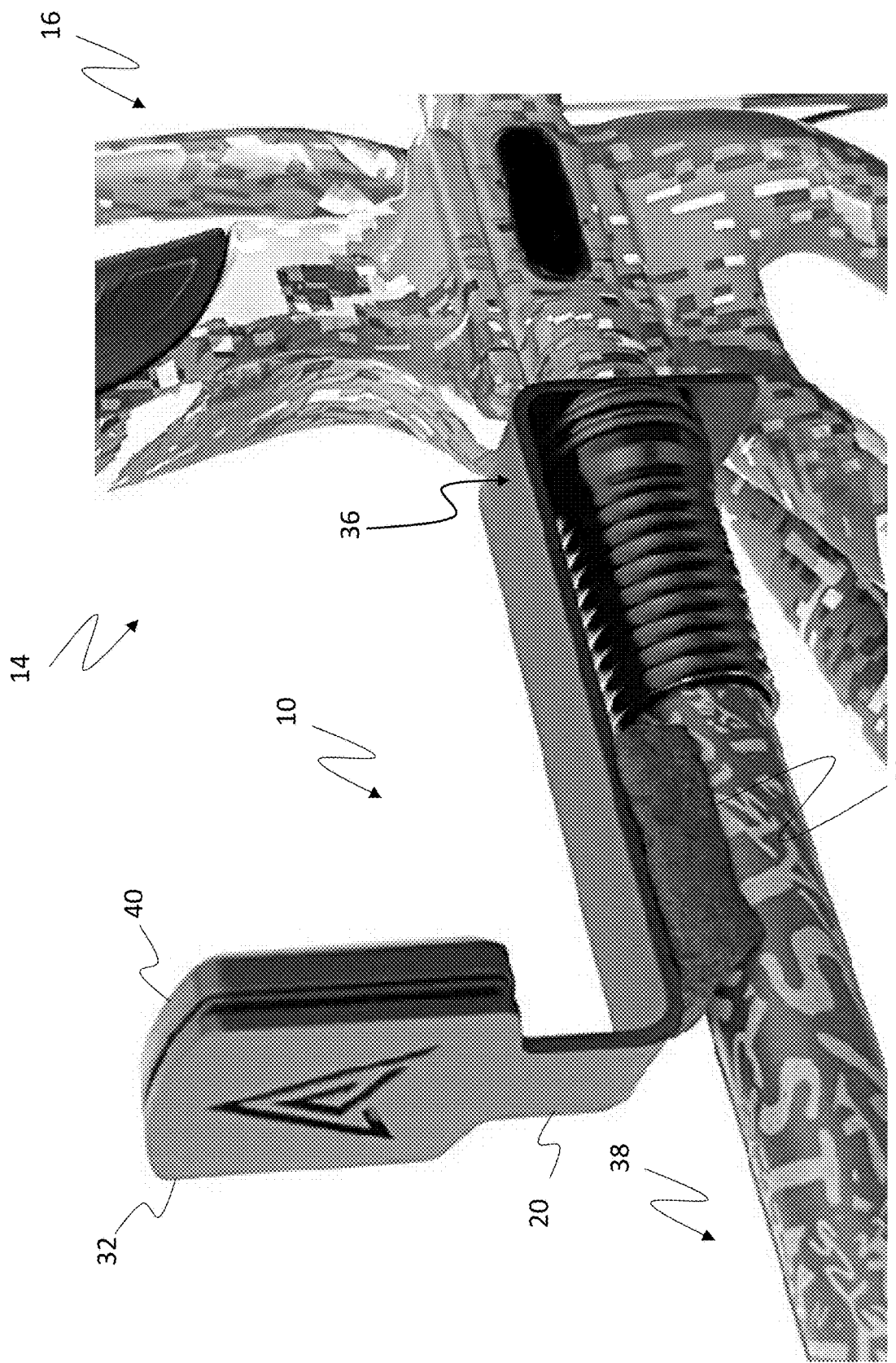
FIG. 6 is an enlarged perspective view of the mounting device of FIG. 1.
Figure 7A:
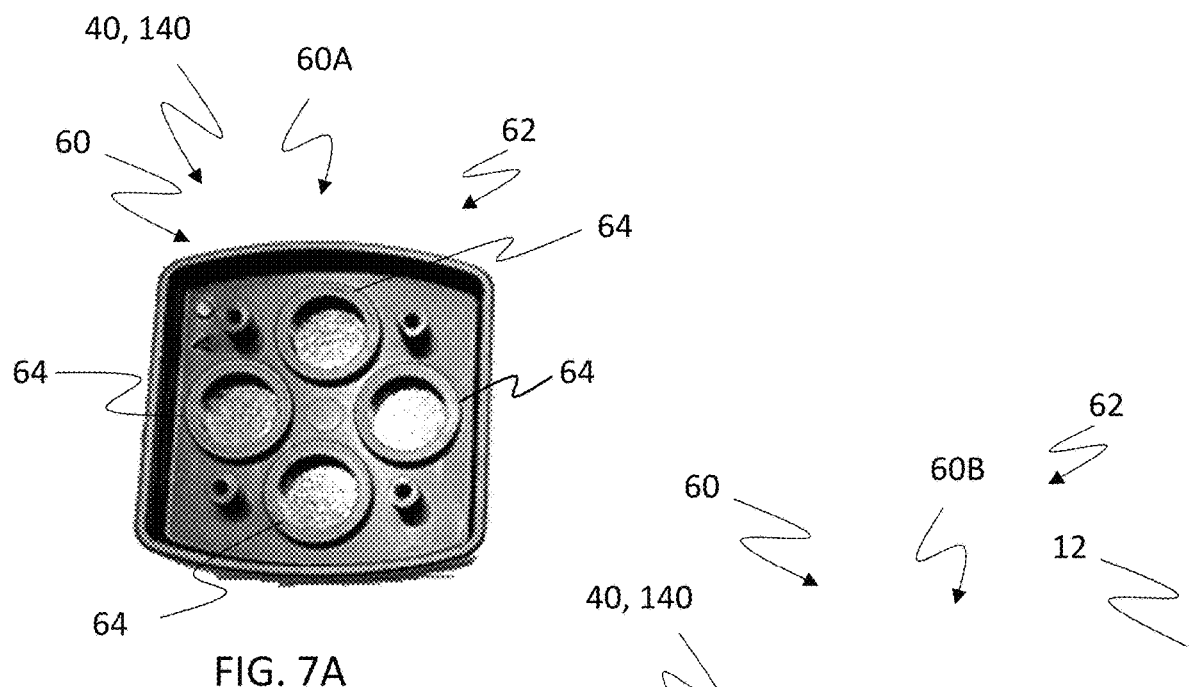
FIGS. 7A-7D are perspective views of the components of a magnetic device of the mounting device of FIG. 1, according to an embodiment of the present invention.
Figure 7B:
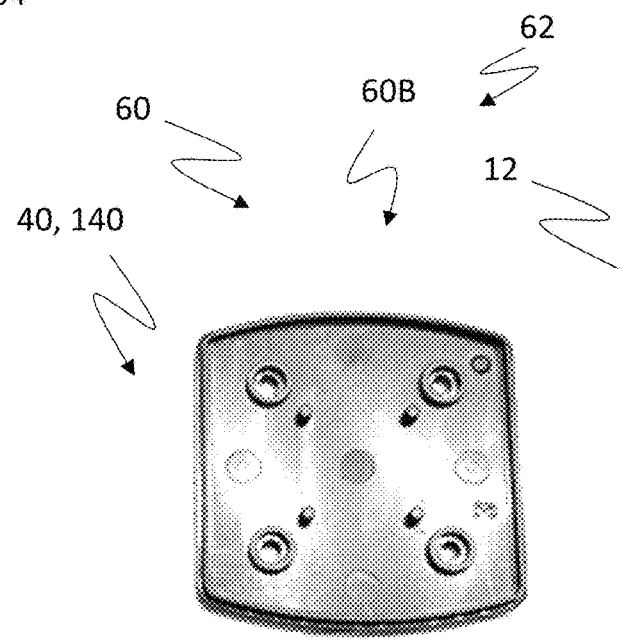
Figure 7C:
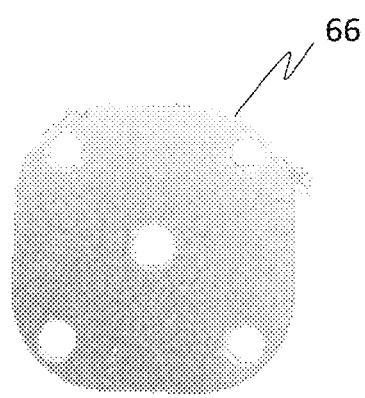
Figure 7D:
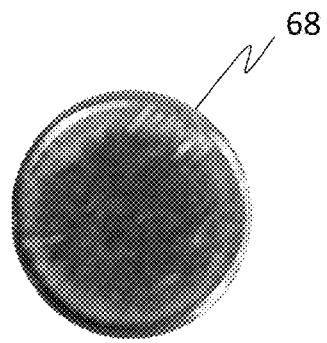
Figure 8:
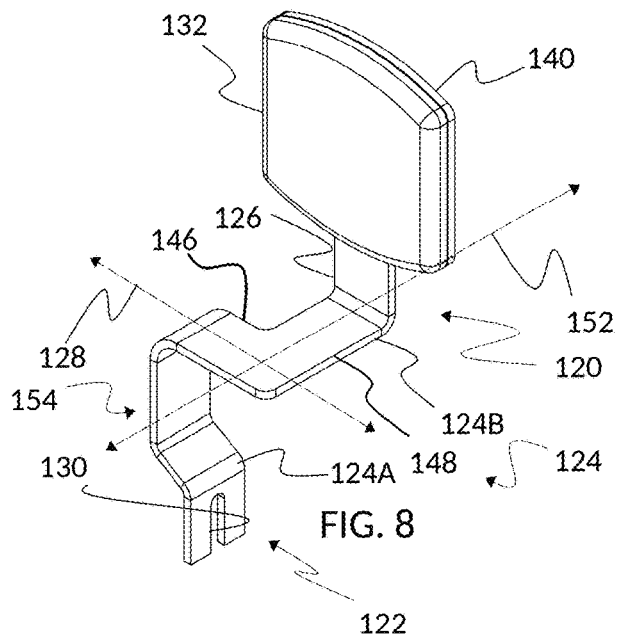
FIG. 8 is a perspective view of a mounting device configured to mount a personal device to sporting equipment, according to a second embodiment of the present invention.
Figure 9:
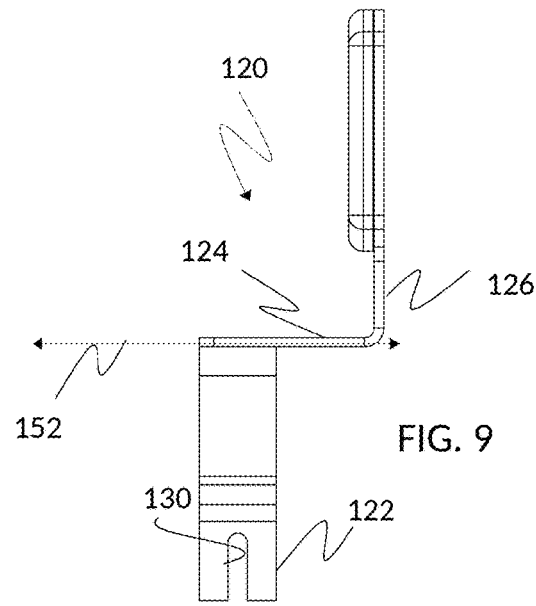
FIG. 9 is a side view of a bracket of the mounting device of FIG. 8.
Figure 10:
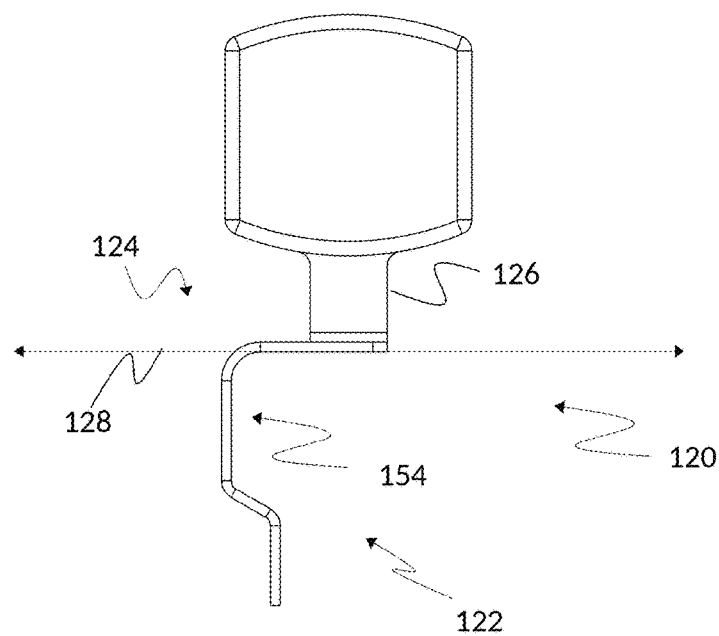
FIG. 10 is a front view of the bracket of FIG. 8.

In the illustrated embodiment, the fastener 36 is part of a stabilizer 38 associated with the compound bow 16. The stabilizer 38 is a threaded accessory that is common among nearly all compound bows on the market. The stabilizer 38 is typically attached to the compound bow 16 using the fastener 38 which is mounted or integral with one end thereof. The stabilizer 38 is attached to the bow 16 with a common thread pattern of 5/16"-24. The stabilizer 38 is not part of the mounting device 10, however, but it is utilized for mounting purposes, as shown in FIGS. 5 and 6.

The dampener 44 has first and second sides 44A, 44B. A layer of adhesive is located on the first side 44A of the dampener 44 to allow the dampener 44 to be affixed to the surface of the middle portion 24 of the mounting bracket 20.

The mounting bracket 20 is mounted to the compound bow 16 via the stabilizer 38 and the fastener 36. Before tightening the fastener 36, the mounting bracket 20 may be adjusted by virtue of the elongated shaped of the slot 30 to compress the dampener 44 between the mounting bracket 20 and the compound bow 16.

The magnetic plate 42 has first and second sides 42A, 42B. The first side 42A has a layer of adhesive to allow the magnetic plate 42A to be affixed to the personal device 12.

A nylon washer 34 may also be provided and may be installed between the stabilizer 38 and the mounting bracket 20 or the mounting bracket 20 and the bow 16. The nylon washer 34 has a few different purposes. First, it is an additional measure to help control the vibration and it also acts as a spacer to help with any fitment issues when fastening the mounting bracket 20 to the bow 16. The nylon washer 34 is optional.

With reference to FIGS. 7A-7D, in one embodiment the magnetic device 40, 140 includes a housing 60, that may be made from a plastic material. As shown, the housing 60 may include a first housing portion 60A and a second housing portion 60B which are fastened together using any appropriate fastener (not shown). The housing 60 defines an internal cavity 62 including one or more receptacles 64 for receiving a respective magnetic 68, e.g., a rare-earth magnet. In the illustrated embodiment the magnets 68 and the receptacles 64 are disk-shaped. A retaining plate 66 is located within the housing 60 and acts to retain the magnets 68 in the respective receptacles 64. In the illustrated embodiment, the magnetic device 40, 140 includes four disk-shaped magnets 68.

With reference to FIGS. 8-13, the mounting device 10 is configured to mount a personal device 12 to sporting equipment that that includes an attachment 150 that may interfere with the configuration of the mounting device 10 shown in FIGS. 1-7. For example, the attachment 150 may be a scope attachment 152 mounted to a crossbow 18.

In the illustrated embodiment, the slot 130 is closed. The slot 130 is elongated and is configured to receive a fastener 136 to allow the mounting bracket 120 to be affixed to the sporting equipment 14. The slot 130 being elongated allows a position of the mounting bracket 120 to be adjusted relative to the sporting equipment 14.

In the illustrated embodiment, the fastener 136 is threaded and received within a threaded aperture (not shown) in the sporting equipment 14, the attachment 150 or an attachment mounting bracket 154.

The dampener 144 has first and second sides 144A, 144B. A layer of adhesive is located on the first side 144A of the dampener 144 to allow the dampener 144 to be affixed to the surface of the middle portion 124 of the mounting bracket 120.

Before tightening of the fastener 136, the mounting bracket 120 may be adjusted by virtue of the elongated shaped of the slot 130 to compress the dampener 144 between the mounting bracket 120 and the crossbow 18.

The magnetic plate 42 has first and second sides 42A, 42B. The first side 42A has a layer of adhesive to allow the magnetic plate 42A to be affixed to the personal device 12.

A nylon washer 34 may also be provided and may be installed between the stabilizer 38 and the mounting bracket 20 or the mounting bracket 120 and the crossbow 18. The nylon washer 34 has a few different purposes. First, it is an additional measure to help control the vibration and it also acts as a spacer to help with any fitment issues when fastening the mounting bracket 120 to the crossbow 18. The nylon washer 134 is optional.

Figure 11:
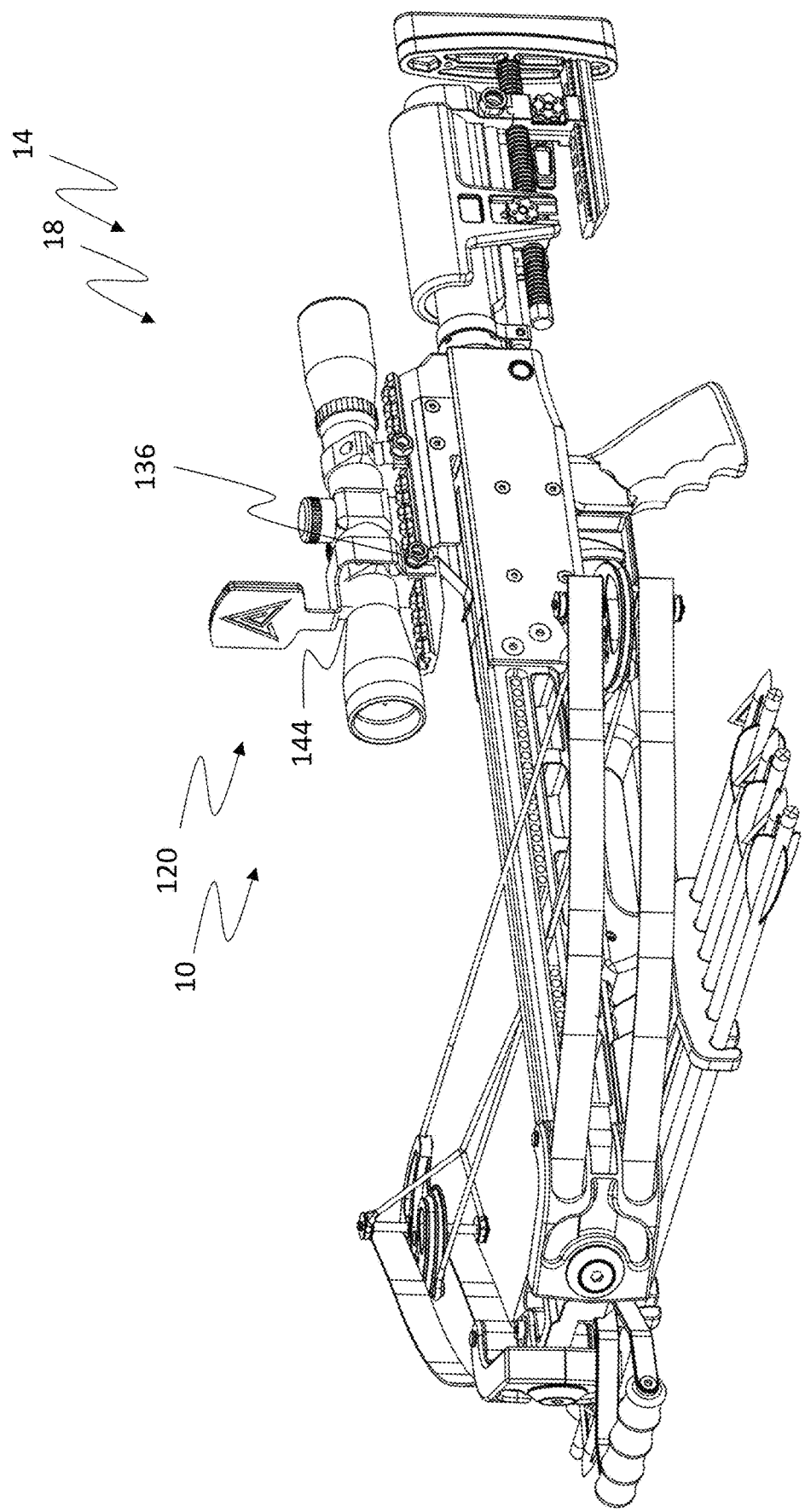
FIG. 11 is a perspective view of the mounting device of FIG. 8 installed on a crossbow.
Figure 12:
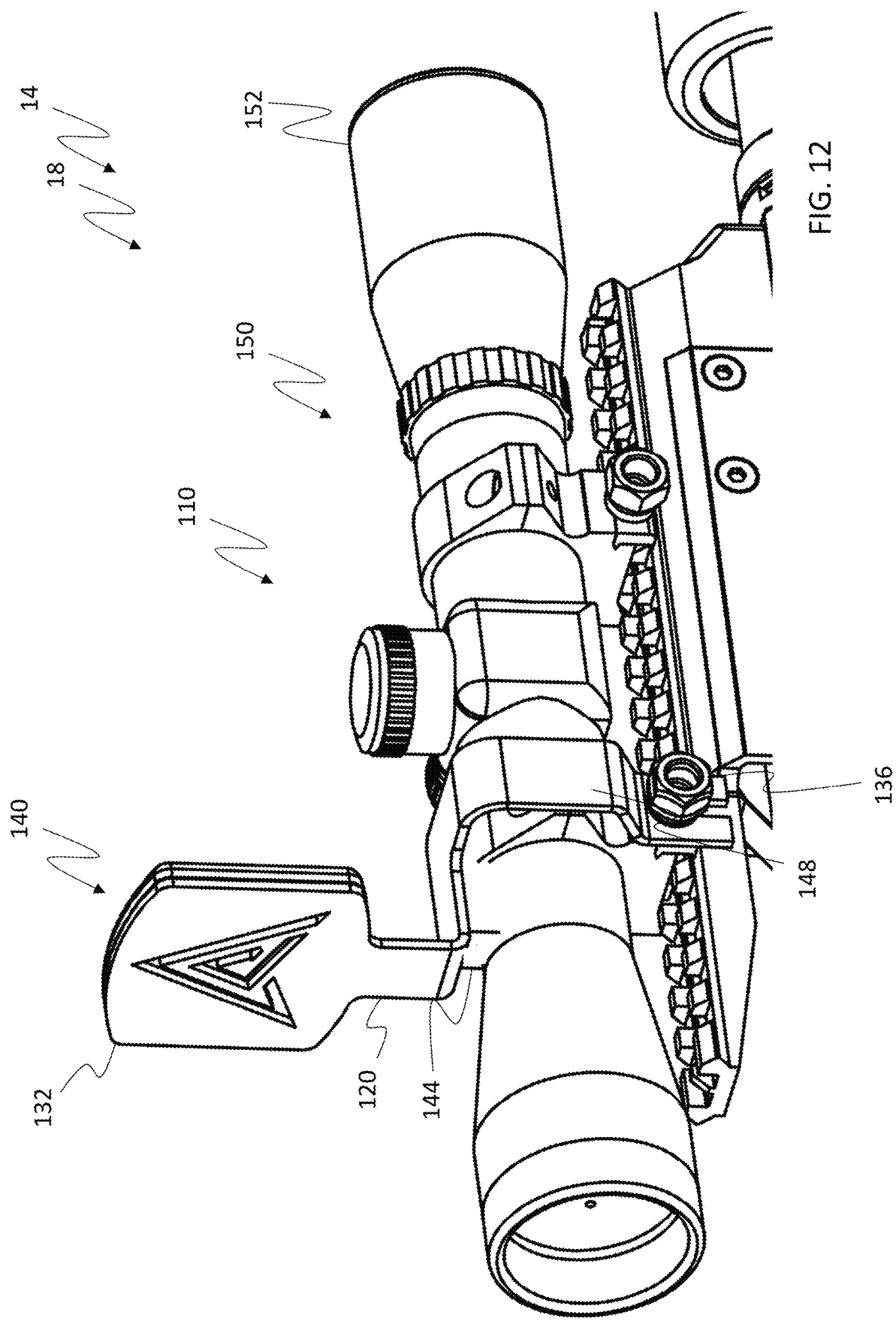
FIG. 12 is an enlarged perspective view of the mounting device of FIG. 8.

As shown in FIGS. 5-6, in a first embodiment the mounting device 10 is mounted to sporting equipment 14 without a scope or other attachment that would affect the user's view (in front of the sporting equipment 14 the mounting device 10 may be mounted directly at a front point of the sporting equipment 14. However, as shown in FIGS. 11-12, it may be desirable or required to mount the personal device 12 in a position to avoid interfering with usage of the attachment 150 or scope 152.

As shown, the mounting bracket 120, rather than being mounted at a front point, may be mounted sideways, i.e., at a side point relative to the sporting equipment to accommodate the attachment 150 or scope 152.

As shown, the middle portion 124 of the mounting bracket 120 may include a first leg 146 and a second leg 148. The first leg 146 extends along the axis 128. The second leg 148 extends at an angle from the axis 128 along a second axis 152. In the illustrated embodiment, the angle is 90 or approximately 90 degrees.

Further, the first end portion 122 of the mounting bracket 120 may include an outward section 154 configured to accommodate a portion of the sporting equipment, such as the attachment 150 or scope 152.

INDUSTRIAL APPLICABILITY

With reference to the drawings, and in operation, the present invention, allows a user to leverage the nicest camera they own, e.g., their smartphone, or other personal device, to film their archery hunting experience. In one embodiment, the mounting device 10 of the present invention is made up of the following components, a steel (14-gauge 1008 steel) bracket, the magnetic device may include, e.g., four N50 neodymium magnets, an optional nylon washer, a one-sided adhesive dampener, and one-sided adhesive steel phone plate.

The mounting device may be fastened to a compound bow via the stabilizer (see above). The stabilizer is a threaded accessory that is common among nearly all compound bows on the market. The stabilizer is not necessarily a part of the mounting device, but it is utilized for mounting purposes. The stabilizer is a necessary part of any archer's setup and is generally attached to the bow with a common thread pattern of 5/16"-24.

The mounting device or magnetic smartphone mount has been designed with a slot that accommodates this thread size and allows it to be compatible with nearly every bow and stabilizer on the market. The slot also aids in the effort to reduce vibration and improve video quality. The slot provides adjustability which allows the bracket to move downward and compress the one-sided adhesive dampener between the bottom of the bracket and the top of the stabilizer. When installing the dampener, it is imperative that the user install it on the bottom side of the bracket underneath the magnet(s) or the furthest away from the mounting slot location. This position helps to mitigate the vibration that is realized by the bracket as a result of the recoil of the bow once an arrow is released. If not controlled, the vibration from the recoil can distort the quality of the video and is very visible when playing back footage taken on the smartphone.

A nylon washer may also be used. While optional, the nylon washer is intended to be installed either between the stabilizer and the bracket or the bracket and the bow. The nylon washer has a few different purposes. First, it is an additional measure to help control the vibration and it also acts as a spacer to help with any fitment issues when fastening the mount to the bow. The nylon washer does not need to be used for this product to work effectively. It would be included in the product for the user to use at their own discretion.

The magnet may be provided installed on the bracket via a one-sided adhesive. This system requires that the user installs a one-sided adhesive plate on the back of the phone, which is provided with the product. The plate is the mechanism that allows the phone to effectively hold firm to the magnet through the full cycle of the shot from start to finish. This product was designed with the intent that the bracket itself would carry much of the load of phone's overall weight. It is imperative that when installed on the mount the phone is sat down on the bracket prior to the plate on the back of the phone connecting to the magnet. This again will help yield the best video quality possible.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A mounting device to mount a personal device to sporting equipment, the sporting equipment having a first member defining a first equipment axis and a second member defining a second equipment axis, the second member being configured to be removably coupled to the first member of the sporting equipment and extending in a direction away from the first member, the first and second axis being perpendicular, comprising:
a mounting bracket having a first end portion, a middle portion and a second end portion, the middle portion having first and second ends and extending between the first and second ends along an axis, the axis being substantially parallel to the second equipment axis, the first end portion having a slot and extending from the first end of the middle portion of the mounting bracket in a first direction transverse the axis, the second end portion extending from the second end of the middle portion of the mounting bracket, the second end portion including a personal device mounting portion, the slot being configured to receive a fastener to allow the mounting bracket to be affixed to the sporting equipment, the slot being elongated to allow a position of the mounted bracket to be adjusted relative to the sporting equipment;
a magnetic device coupled to the personal device mounting portion of the send end portion of the mounting bracket;
a magnetic plate configured to be affixed to the personal device and to be removably coupled to the magnetic device; and
a dampener affixed to a surface of the middle portion of the mounting bracket and configured to be compressed between the middle portion of the mounting bracket and a surface of the sporting equipment when mounted thereto, the surface being defined by the second member, the mounting bracket being configured to allow the mounting device to be mounted to the sporting equipment via the elongated slot and to be adjusted relative to the second member to compress the dampener between the middle portion of the mounting bracket and the surface.

2. The mounting device, as set forth in claim 1, wherein the slot is closed.

3. The mounting device, as set forth in claim 1, wherein the slot is open.

4. The mounting device, as set forth in claim 1, wherein the sporting equipment is a compound bow, and the fastener is associated with a stabilizer of the compound bow.

5. The mounting device, as set forth in claim 1, wherein the mounting bracket is composed from steel.

6. The mounting device, as set forth in claim 1, wherein the mounting bracket is composed from 14-gauge 1008 steel.

7. The mounting device, as set forth in claim 1, wherein the magnetic plate has first and second sides, the first side having adhesive to allow the magnetic plate to be affixed to the person device.

8. The mounting device, as set forth in claim 1, wherein the dampener has first and second sides, the first side having adhesive to allow the dampener to be affixed to the surface of the middle portion of the mounting bracket.

9. The mounting device, as set forth in claim 1, wherein the middle portion of the mounting bracket includes a first leg and a second leg, the first leg extending along the axis, the second leg extending at an angle from the axis along a second axis.

10. The mounting device, as set forth in claim 9, wherein the angle is 90 degrees.

11. The mounting device, as set forth in claim 9, wherein the first end portion of the mounting bracket includes an outward section configured to accommodate a portion of the sporting equipment.

12. The mounting device, as set forth in claim 1, wherein the sporting equipment is a compound bow.

13. The mounting device, as set forth in claim 1, wherein the sporting equipment is a crossbow.

14. The mounting device, as set forth in claim 13, wherein the outward section allows the mounting bracket to accommodate a scope associated with the sporting equipment.

15. The mounting device, as set forth in claim 1, wherein the sporting equipment is a firearm.

16. The mounting device, as set forth in claim 1, wherein the magnetic device includes a housing a cavity and at least one magnetic within the cavity.

17. The mounting device, as set forth in claim 16, wherein the housing includes at least one receptacle within the cavity to receive a respective magnet.

18. The mount device, as set forth in claim 17, the magnetic device including a retaining plate located within the cavity of the housing to retain the magnet within the receptacle.

\* \* \* \* \*

UNITED STATES PATENT AND TRADEMARK OFFICE
CERTIFICATE OF CORRECTION

PATENT NO. : 12,181,782 B2
APPLICATION NO. : 18/060151
DATED : December 31, 2024
INVENTOR(S) : Nathaniel Allen Hicks and Devin Michael Cole It is certified that error appears in the above-identified patent and that said Letters Patent is hereby corrected as shown below:

In the Claims

Column 5, Lines 51-Column 6, Line 26, should read:
1. A mounting device to mount a personal device to sporting equipment, the sporting equipment having a first member defining a first equipment axis and a second member defining a second equipment axis, the second member being configured to be removably coupled to the first member of the sporting equipment and extending in a direction away from the first member, the first and second axis being perpendicular, comprising:
    a mounting bracket having a first end portion, a middle portion and a second end portion, the middle portion having first and second ends and extending between the first and second ends along an axis, the axis being substantially parallel to the second equipment axis, the first end portion having a slot and extending from the first end of the middle portion of the mounting bracket in a first direction transverse the axis, the second end portion extending from the second end of the middle portion of the mounting bracket, the second end portion including a personal device mounting portion, the slot being configured to receive a fastener to allow the mounting bracket to be affixed to the sporting equipment, the slot being elongated to allow a position of the mounted bracket to be adjusted relative to the sporting equipment;
    a magnetic device coupled to the personal device mounting portion of the second end portion of the mounting bracket;
    a magnetic plate configured to be affixed to the personal device and to be removably coupled to the magnetic device; and
    a dampener affixed to a surface of the middle portion of the mounting bracket and configured to be compressed between the middle portion of the mounting bracket and a surface of the sporting equipment when mounted thereto, the surface being defined by the second member, the mounting bracket being configured to allow the mounting device to be mounted to the sporting equipment via the elongated slot and to be adjusted relative to the second member to compress the dampener between the middle portion of the mounting bracket and the surface.

Signed and Sealed this
Fourth Day of February, 2025

Coke Morgan Stewart
*Acting Director of the United States Patent and Trademark Office*